(12) United States Patent
Peterson

(10) Patent No.: US 7,867,390 B1
(45) Date of Patent: Jan. 11, 2011

(54) FLOATING WEED AND DEBRIS REMOVAL SYSTEM AND ASSOCIATED METHOD

(76) Inventor: Robert Peterson, 31 Wild Way Lake, Hopatcong, NJ (US) 07849

( * ) Notice: Subject to any disclaimer, the term of this patent is extended or adjusted under 35 U.S.C. 154(b) by 99 days.

(21) Appl. No.: 12/321,577

(22) Filed: Jan. 22, 2009

Related U.S. Application Data

(60) Provisional application No. 61/062,103, filed on Jan. 24, 2008.

(51) Int. Cl.
*C02F 1/40* (2006.01)
*E02D 31/00* (2006.01)

(52) U.S. Cl. .............................. 210/170.09; 210/170.11; 210/523; 239/200; 239/562; 239/565; 239/587.3; 405/60; 405/74; 405/211

(58) Field of Classification Search ................. 210/747, 210/776, 156, 162, 170.09, 170.11, 242.1, 210/242.3, 523; 239/200, 462, 548, 562, 239/565, 587.3, 587.4; 405/60, 74, 80, 127, 405/211
See application file for complete search history.

(56) References Cited

U.S. PATENT DOCUMENTS

| | | | | |
|---|---|---|---|---|
| 2,330,508 A | * | 9/1943 | McColl | 210/242.3 |
| 3,219,189 A | * | 11/1965 | Moore | 210/513 |
| 4,033,869 A | * | 7/1977 | McGrew | 210/242.3 |
| 4,425,240 A | * | 1/1984 | Johnson | 210/242.3 |
| 5,052,855 A | * | 10/1991 | Chapman et al. | 405/127 |
| 5,108,600 A | * | 4/1992 | Rees et al. | 210/242.3 |
| 5,433,229 A | * | 7/1995 | Blair | 210/242.1 |
| 6,290,844 B1 | * | 9/2001 | Tennyson, Jr. | 210/170.09 |
| 6,736,572 B2 | * | 5/2004 | Geraghty | 405/60 |
| 6,932,277 B1 | * | 8/2005 | Ericksen et al. | 239/562 |
| 2008/0185351 A1 | * | 8/2008 | Hughes | 210/170.11 |

* cited by examiner

*Primary Examiner*—Christopher Upton

(57) ABSTRACT

An automated water discharging system for prohibiting buoyant debris from reaching and engaging an existing support structure that is partially submerged in an existing body of water may include a mechanism for extracting and channeling water from beneath a water line to above a water line of the existing body of water. Additionally, a mechanism for distributing water from above the water line to a plurality of third locations may be included by creating an artificial current flowing away from the existing support structure. A plurality of conduits and a power-actuated pump may direct the water and debris from one location to the next. Discharge nozzles may discharge the water at an angle defined downwardly towards the water line to thereby create the artificial current leading away from the existing support structure. A controller may be included to adjust the flow rate of the nozzles and the corresponding artificial current.

10 Claims, 8 Drawing Sheets

FLOATING WEED AND DEBRIS REMOVAL SYSTEM AND ASSOCIATED METHOD

CROSS REFERENCE TO RELATED APPLICATIONS

This application claims the benefit of U.S. Provisional Application No. 61/062,103, filed Jan. 24, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to water cleaning systems, and more particularly, to an automated water discharging system for prohibiting buoyant debris from reaching and engaging an existing support structure that is partially submerged in an existing body of water.

2. Prior Art

Weeds and plants grow in and along the shores of most man-made lakes and ponds. Many owners of homes and cabins along the shorelines of such ponds and lakes enjoy using the shallow portions of these bodies of water for swimming, boat launching, and other water activities. The weeds are a nuisance and interfere with such activities. Removing the weeds manually with rakes or other tools is a labor intensive, boring task. Moreover, the weeds are then piled up on shore or floating in the water, and must be removed. Bulky, mechanical weed harvesters are not practical for private, individual use, while chemical treatments are unsatisfactory from an environmental perspective. Moreover, any weed removal process must typically be repeated shortly thereafter, since weeds grow rapidly.

U.S. Pat. No. 5,412,884 to Staples et al discloses a dragline apparatus for cleaning waste material and sludge in clarifier and settling ponds and lagoons which includes a pair of side walls and a back wall forming a frame supported on front and rear flotation rollers. Between the home member is at least one blade, pivotally mounted for swinging movement from an active to an inactive position. Cables are connected to the front and rear of the frame and to prime movers on the banks of a pond to be cleaned.

U.S. Pat. No. 5,314,619 to Runyon discloses an apparatus for improvement of water quality in a pond or similar body of water. A main conduit is located below the water surface and extending generally parallel to the shoreline. A plurality of distribution conduits are attached at intervals to the main conduit and operated sequentially so that water pumped through the system causes circulation of water in the pond. Each distribution conduit will preferably incorporate an aspirator to aerate the pumped water. The pumped water will also normally contain a mixture of microorganisms, enzymes and nutrients which are discharged into the body of water to clarify the body of water of contaminants and to maintain the water quality thereafter. Also disclosed is a method of improving water quality using the apparatus and the mixture. The invention provides for thorough, efficient and rapid decontamination of ponds and elimination of stagnant areas, as well as for maintaining the ponds in clean and healthy conditions.

U.S. Pat. No. 5,542,142 to Young discloses a cleaning device for removing debris from a pond or other body of water including an elongated tubular member having an internal collection chamber for collecting water and debris, an inlet nozzle at the lower end of the member connected to the collection chamber, and an outlet at the upper end of the member also connected to the chamber. The outlet has an air hole which can be closed to trap air in the collection chamber while the lower end of the device is submerged in the water to a location adjacent debris to be collected. When the air hole is uncovered, water and debris will be drawn into the collection chamber through the inlet nozzle. The collected water and debris is trapped in the chamber while the device is moved from the water and taken to a disposal area, where it is inverted to drain collected water and debris from the chamber via the outlet.

The present invention satisfies such a need by providing a system that is convenient and easy to use, is durable yet lightweight in design, is versatile in its applications, and provides owners of waterfront properties with a simple means to automatically clear away unsightly floating weeds and debris.

BRIEF SUMMARY OF THE INVENTION

In view of the foregoing background, it is therefore an object of the present invention to provide a system for prohibiting buoyant debris from reaching and engaging an existing support structure that is partially submerged in an existing body of water. These and other objects, features, and advantages of the invention are provided by an automated water discharging system.

An automated water discharging system for prohibiting buoyant debris from reaching and engaging an existing support structure that is partially submerged in an existing body of water may include a mechanism for extracting and channeling water from a first location to a second location. The first location may be defined beneath a water line of the existing body of water while the second location may be defined above the water line of the existing body of water. Thus, the water extraction and channeling mechanism may draw in water from a pond, lake, or other natural or man-made body and channel the water to a separate location within the system.

The water discharging system may further include a filter disposed at the first location which may be directly coupled to the water extracting and channeling mechanism. The filter advantageously prohibits debris and particles from entering the system and blocking further flow of water therethrough. Additionally, a mechanism for distributing water from the second location to a plurality of third locations, preferably locations near the edge of a dock or other structure near the water line, may be included. Such a water distributing mechanism may operate such that the water may be selectively discharged downwardly towards the water line to thereby create an artificial current flowing away from the existing support structure. This may advantageously urge the buoyant debris away from the existing support structure. The water distributing mechanism may further be selectively adjustable between open and closed positions for regulating a flow rate of the artificial current. Therefore, a user may advantageously employ the system to draw water out of a water channel or pond and rapidly eject the water back onto the surface of the channel or pond to dispel floating debris and weeds.

The water extracting and channeling mechanism may additionally include a first conduit preferably having a distal end submerged below the water line and situated at the first location. The first conduit further may have a proximal end situated above the water line. The water extracting mechanism may also include a power-actuated pump directly coupled to the proximal end of the first conduit and in fluid communication with the first conduit. The distal end of the first conduit may be in fluid communication with the filter. Therefore, the water may be drawn in from the pond or channel through the filter by force generated by the pump. Further, a second conduit may be coupled to the pump and extended downstream therefrom, such that the second conduit may channel the water away from the first location and to the second location.

The water distributing mechanism may further include a water distribution manifold housed at the second location. Such a water distribution manifold may have an inlet directly coupled to the second conduit such that the water distribution manifold may receive the water downstream from the second conduit as it is directed therethrough by the power-actuated pump. In addition, the water distribution manifold may have a plurality of outlets situated downstream of the inlet. The water distributing mechanism may also include a plurality of intermediate conduits removably coupled to the outlets to thereby independently distribute the water away from the second location and along a plurality of mutually exclusive travel paths leading to the third locations respectively. Thus, the water may be rapidly forced through the second conduit by the pump and directed to the multitude of intermediate conduits by the distribution manifold to be directed to various locations along the dock or other existing structure on which the system is mounted. The water distributing mechanism therefore advantageously allows water to be drawn in from a single location and rapidly ejected to a variety of locations to clean debris away from a larger surface area around a dock.

Additionally, the water distributing mechanism may include a plurality of terminal conduits. Each of such terminal conduits may be coupled to a corresponding one of the intermediate conduits respectively such that the water may be directed along a plurality of non-overlapping linear travel paths while traveling to the third locations. The mechanism may also include a plurality of discharge nozzles fluidly coupled to the terminal conduits in such a manner that the water may be discharged at an angle defined downwardly towards the water line to thereby create the artificial current leading away from the existing support structure. The discharge nozzles may be adjusted to an angle to most effectively create a steady current with a suitable flow rate to move larger pieces of floating debris.

The water distributing mechanism further may include a plurality of swivel joints rotatably mating ingress ports of the discharge nozzles to egress ports of the terminal conduits respectively. In this manner, each of the discharge nozzles may be independently articulated along a mutually exclusive arcuate path adjoining a corresponding one of the terminal conduits respectively. Thus, a user may advantageously set each individual nozzle to direct water at a desired angle to allow debris to be directed away from the existing structure. For example, as the conduits may travel around the corners of the dock or retaining wall the nozzles may be each angled to direct the debris out to a central location of the channel to thereby be drawn downstream and away from the user's property.

The automated water discharging system further may include a mechanism for automatically adjusting the water discharging angle egressing from the discharge nozzles. Such a mechanism may operate such that the artificial current may continuously flow away from the existing support structure to thereby prohibit the buoyant debris from reaching the existing support structure. This may advantageously prevent build up of weeds, wood debris, and other waste floating in the lake or channel near the user's property, creating an aesthetically appealing environment and preserving the natural beauty of the waterfront property.

The water discharge angle adjusting mechanism may additionally include a plurality of eyelets anchored to the existing support surface and a plurality of cables preferably having distal ends anchored to the terminal conduits. Each of the cables may be passed through corresponding ones of the eyelets respectively. The water discharge angle adjusting mechanism may also include a winch positioned above the water line and communicatively coupled to proximal ends of the cables such that the cables may be selectively wound and unwound about the winch as desired by the user. The terminal conduits may be uniformly raised and lowered when the cables are wound and unwound from the winch to thereby raise and lower the discharge nozzles respectively. In this manner, a user may raise and lower the discharge nozzles as the tide rises and falls, thereby advantageously keeping the nozzles above the water at a desired height to continue a steady flow of water away from the water edge.

The water discharge angle adjusting mechanism may also include a controller preferably being programmable to receive at least one user-defined operating parameter. The operating parameter may be defined as a minimum threshold vertical distance between the water line and at least one of the discharge nozzles respectively. The angle adjusting mechanism may further include a plurality of sensors communicatively coupled to the controller and the discharge nozzles respectively.

Additionally, a plurality of actuators may be included and communicatively coupled to the controller and the swivel joints respectively. The actuators may bias the swivel joints to a desired position based upon information gathered and transmitted from the sensors to the controller. Each of the sensors may detect a real-time vertical distance between a corresponding one of the discharge nozzles and the water line. The sensors may periodically generate and transmit a plurality of distance signals to the controller respectively.

Further, each of the user-defined minimum threshold vertical distances and the distance signals may have an associated numerical value embedded therein respectively. In this manner, the water discharge angle adjusting mechanism may automatically maintain the desired angle of water discharge from the system. If the tide rises or falls, the controller may receive signals from the sensors, calculate the distance between the nozzles and water surface, and adjust the angle of distribution from each nozzle accordingly to maintain the desired flow rate of water moving away from the user's property.

The controller may additionally include a processor and a memory communicatively coupled to the processor. The memory may include software instructions that cause the controller to generate and transmit a control signal to each of the discharge nozzles when at least one of the real-time vertical distance drops below a corresponding one of the at least one user-defined minimum threshold vertical distances respectively.

Further, the software instructions may include and execute a control logic algorithm including the steps of the controller first learning the real-time vertical distances by receiving the detected signals from the sensors respectively. The controller may then compare the real-time vertical distances with a corresponding one of the at least one user-defined minimum threshold vertical distance.

Thirdly, if an associated one of the real-time vertical distances is less than the corresponding one of the at least one user-defined minimum threshold vertical distances, then the processor may generate and transmit a first control signal to one of the actuators associated with the discharge nozzle. Finally, if an associated one of the real-time vertical distances is greater than the corresponding one of the at least one user-defined minimum threshold vertical distance, then the processor may repeat the first three steps.

The first control signal may cause a corresponding one of the actuators to pivot a corresponding one of the swivel joints and thereby articulate a corresponding one of the discharge nozzles to an elevated position. The controller provides the unexpected and unpredictable result of automatically maintaining the nozzles at a desired angle even when the tide raises and lowers the level of the water in relation to the positioning of the system. Such a beneficial feature is not rendered obvious by one skilled in the art.

The automated water discharging system further may include a mechanism for automatically toggling the water extracting and channeling mechanism between operating and non-operating modes. The automatic toggling mechanism may include a timer switch communicatively coupled to the pump and further adapted to be electrically coupled to an existing external power supply source. The timer switch may be automatically toggled between open and closed positions based upon programmable user-defined parameters such that power may be interrupted to the pump when the timer switch is at the open position. The programmable timer switch may advantageously allow the user to determine certain times of the day when the system may operate to clear debris from the user's property. Thus, to prevent the system from operating at times when the user may be using or enjoying the dock or water edge, the user may set the system to only operate at night, for example.

The present invention may further include a method for prohibiting buoyant debris from reaching and engaging an existing support structure that is partially submerged in an existing body of water. Such a method may include the chronological steps of first providing a mechanism for extracting and channeling water from a first location to a second location. The first location may be defined beneath a water line of the existing body of water and the second location may be defined above the water line of the existing body of water.

Second, the method may include providing and disposing a filter at the first location. Third, the method may entail directly coupling the filter to the water extracting and channeling mechanism. A fourth step of the method may include providing a mechanism for distributing water from the second location to a plurality of third locations.

Fifth, the method may include extracting and channeling the water from the first location to the second location. A sixth step may entail selectively discharging the water downwardly towards the water line to thereby create an artificial current flowing away from the existing support structure for urging the buoyant debris away from the existing support structure. Finally, the method may include a seventh step of selectively adjusting the water distributing mechanism between open and closed positions for regulating a flow rate of the artificial current.

The present invention provides the user with the unpredictable and unexpected result of not having to laboriously collecting trash with a rake, pull leaves by hand, or load and haul away the offending debris floating near their dock or retaining wall. The present invention may enhance maintenance endeavors for waterfront properties, handily beautify landscapes, and help to increase their aesthetic and monetary values. The combination of elements in the system is not rendered obvious by one skilled in the art.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
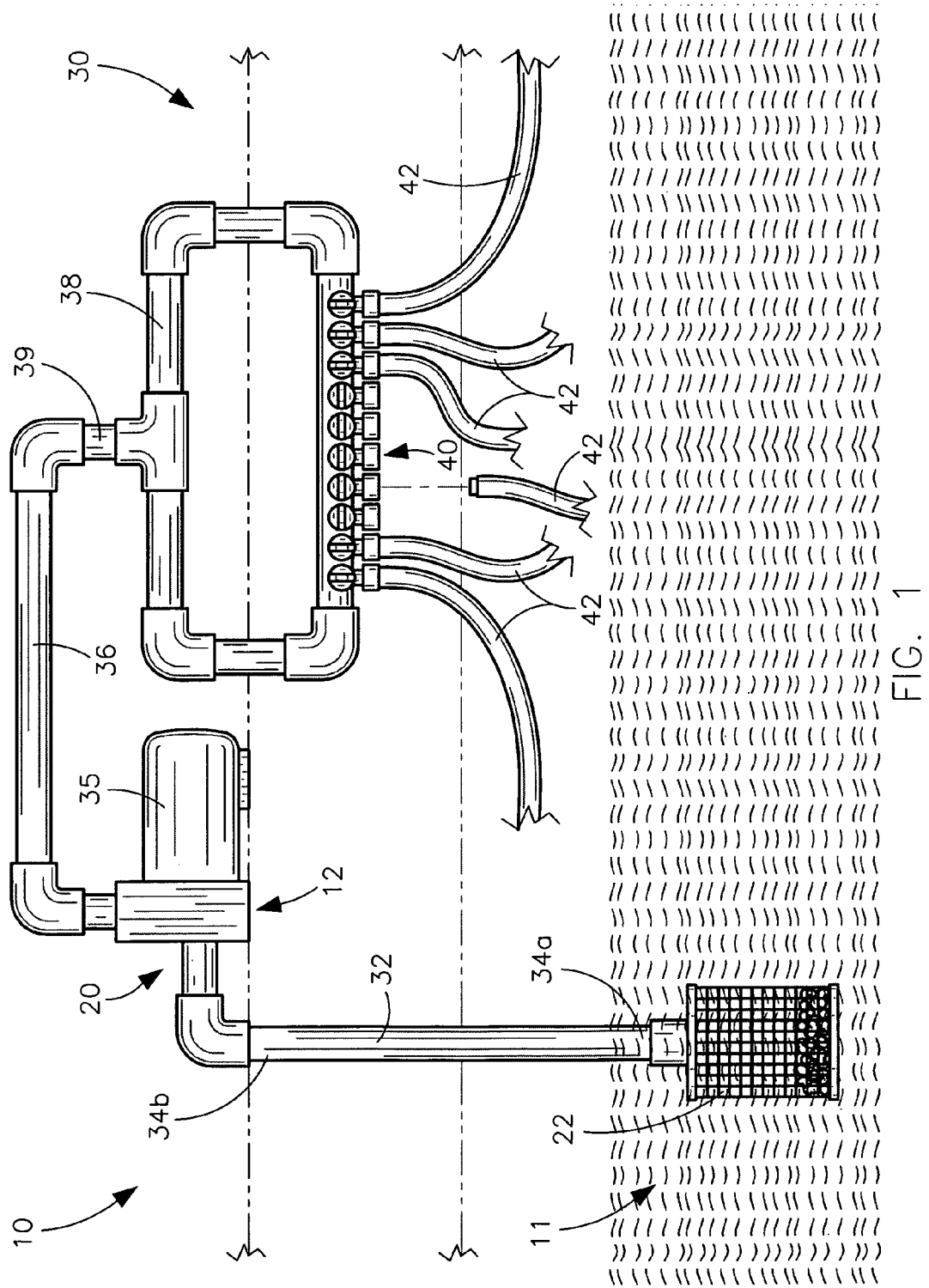
FIG. 1 is a front elevational view showing the water channeling mechanism and a portion of the water distributing mechanism, in accordance with the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-7 by the reference numeral 10 and is intended to provide an automated water discharging system. It should be understood that the automated water discharging system 10 may be used to remove floating weeds and debris in many different applications and should not be limited to only being used with man-made lakes and ponds.

Referring to FIGS. 1-7 in general, an automated water discharging system 10 for prohibiting buoyant debris from reaching and engaging an existing support structure that is partially submerged in an existing body of water may include a mechanism 20 for extracting and channeling water from a first location 11 to a second location 12. The first location 11 may be defined beneath a water line of the existing body of water while the second location 12 may be defined above the water line of the existing body of water. Thus, the water extraction and channeling mechanism 20 may draw in water from a pond, lake, or other natural or man-made body and channel the water to a separate location within the system 10.

The water discharging system 10 may further include a filter 22 disposed at the first location 11 which may be directly coupled to the water extracting and channeling mechanism 20. The filter 22 advantageously prohibits debris and particles from entering the system 10 and blocking further flow of water therethrough. Additionally, a mechanism 30 for distributing water from the second location 12 to a plurality of third locations 13, preferably locations near the edge of a dock or other structure near the water line, may be included. Such a water distributing mechanism 30 may operate such that the water may be selectively discharged downwardly towards the water line to thereby create an artificial current flowing away from the existing support structure.

This advantageously urges the buoyant debris away from the existing support structure. The water distributing mechanism 30 may further be selectively adjustable between open and closed positions for regulating a flow rate of the artificial current. Therefore, a user may advantageously employ the system 10 to draw water out of a channel or pond and rapidly eject the water back onto the surface of the channel or pond to dispel floating debris and weeds.

Referring specifically to FIG. 1, the water extracting and channeling mechanism 20 may additionally include a first conduit 32 preferably having a distal end 34A submerged below the water line and situated at the first location 11. The first conduit 32 further may have a proximal end 34B situated above the water line. The water extracting mechanism 20 may also include a power-actuated pump 35 directly coupled to the proximal end 34B of the first conduit 32 and in fluid communication with the first conduit 32.

The distal end 34A of the first conduit 32 may be in fluid communication with the filter 22. Therefore, the water may be drawn in from the pond or channel through the filter 22 by force generated by the pump 35. Further, a second conduit 36 may be coupled to the pump 35 and extended downstream therefrom, such that the second conduit 36 may channel the water away from the first location 11 and to the second location 12.

The water distributing mechanism 30 may further include a water distribution manifold 38 housed at the second location 12. Such a water distribution manifold 38 may have an inlet 39 directly coupled to the second conduit 36 such that the water distribution manifold 38 may receive the water downstream from the second conduit 36 as it is directed therethrough by the power-actuated pump 35.

In addition, the water distribution manifold 38 may have a plurality of outlets 40 situated downstream of the inlet 39. The water distributing mechanism 30 may also include a plurality of intermediate conduits 42 removably coupled to the outlets 40 to thereby independently distribute the water away from the second location 12 and along a plurality of mutually exclusive travel paths leading to the third locations 13 respectively.

Thus, the water may be rapidly forced through the second conduit 36 by the pump 35 and directed to the multitude of intermediate conduits 42 by the distribution manifold 38 to be directed to various locations along the dock or other existing structure on which the system 10 is mounted. The water distributing mechanism 30 therefore advantageously allows water to be drawn in from a single location and rapidly ejected to a variety of locations to clean debris away from a larger surface area around a dock.

Now referring to FIGS. 2a-5, the water distributing mechanism 30 may include a plurality of terminal conduits 44. Each of such terminal conduits 44 may be coupled to a corresponding one of the intermediate conduits 42 respectively such that the water may be directed along a plurality of non-overlapping linear travel paths while traveling to the third locations 13. The mechanism 30 may also include a plurality of discharge nozzles 45 fluidly coupled to the terminal conduits 44 in such a manner that the water may be discharged at an angle defined downwardly towards the water surface to thereby create the artificial current leading away from the existing support structure. The discharge nozzles 45 may be adjusted to an angle to most effectively create a steady current with a high enough flow rate to move larger pieces of floating debris.

Figure 2A:
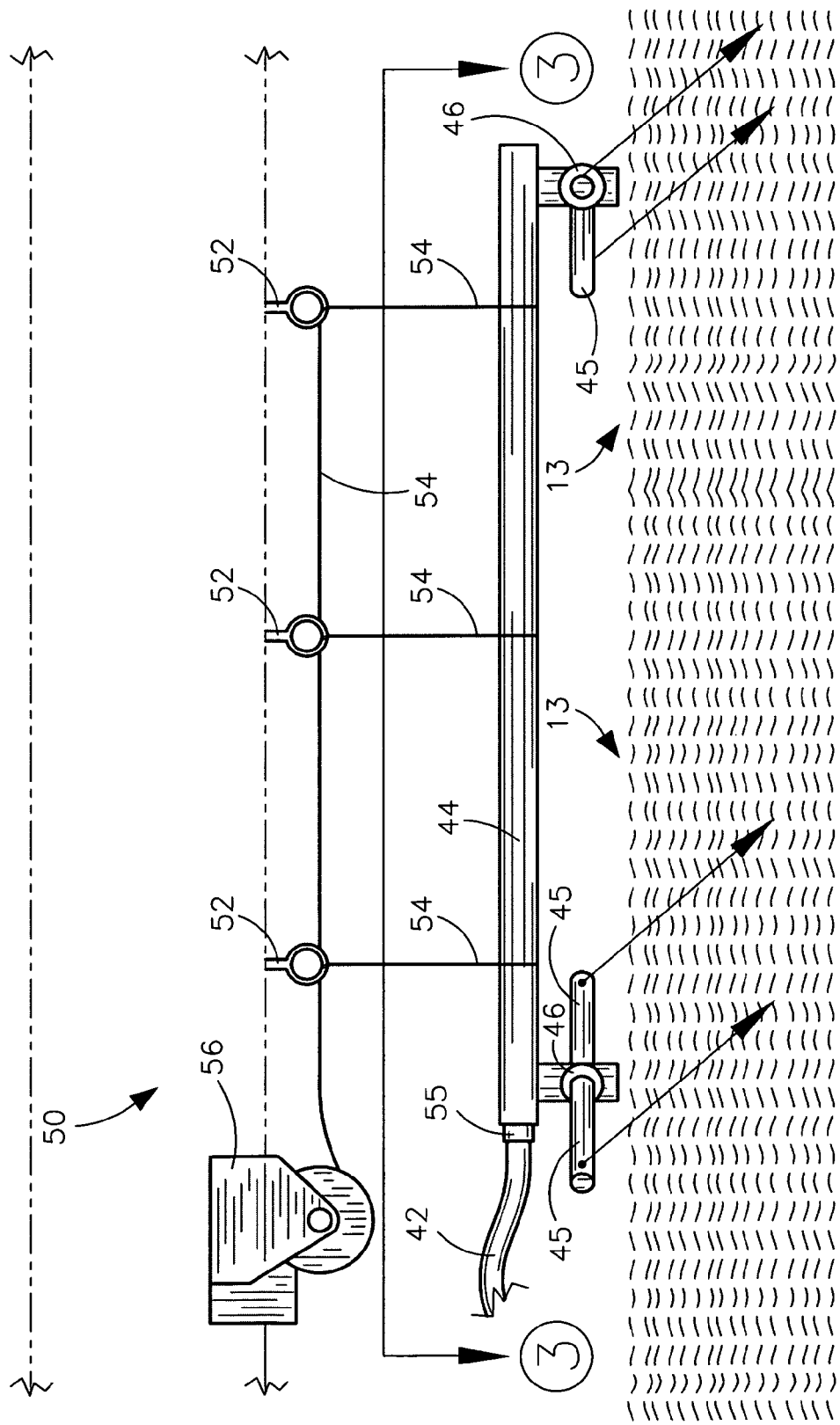
FIGS. 2a-2b are side elevational views showing a portion of the water distributing mechanism and a portion of the discharge angle adjusting mechanism at alternate positions.
Figure 2B:
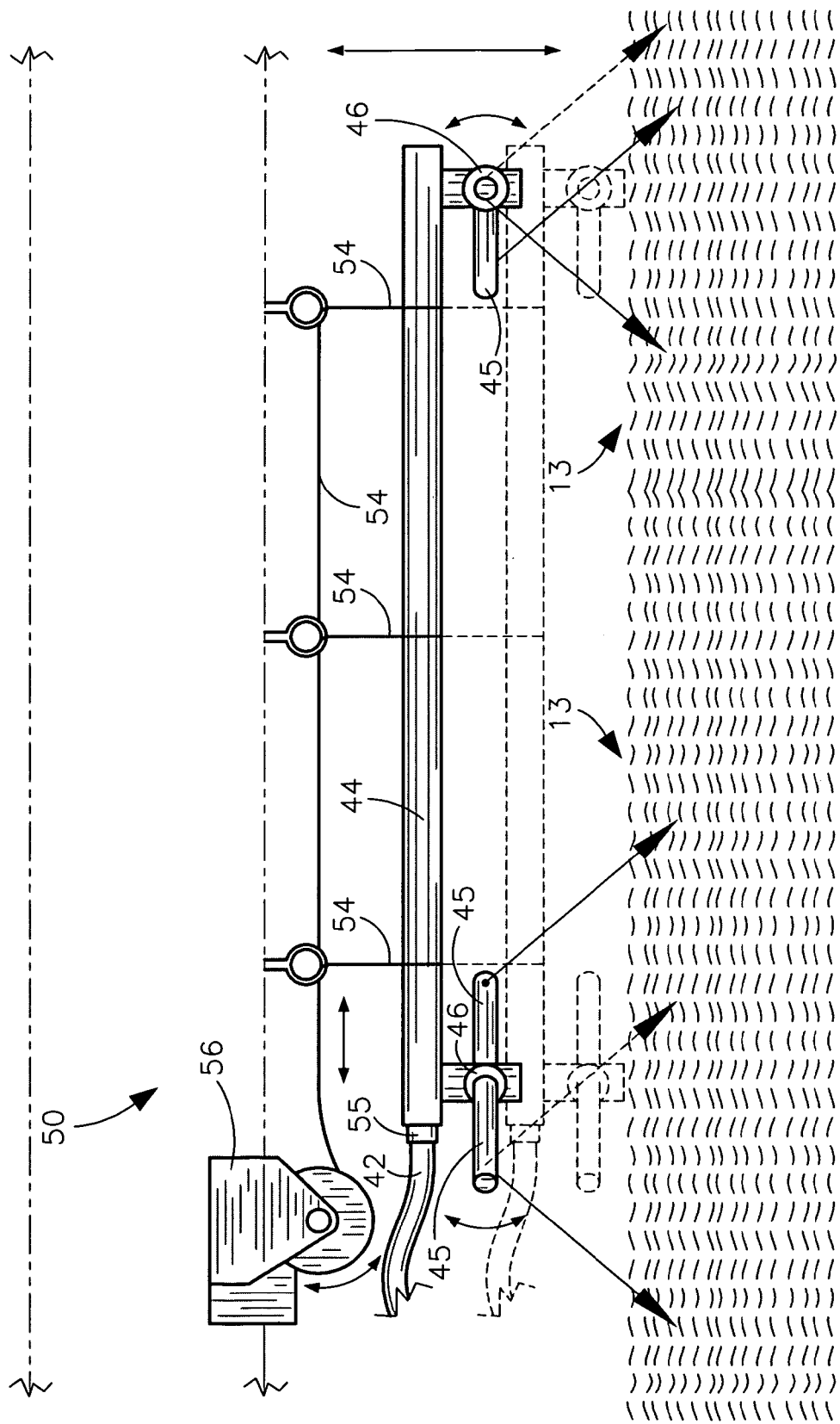
Figure 3:
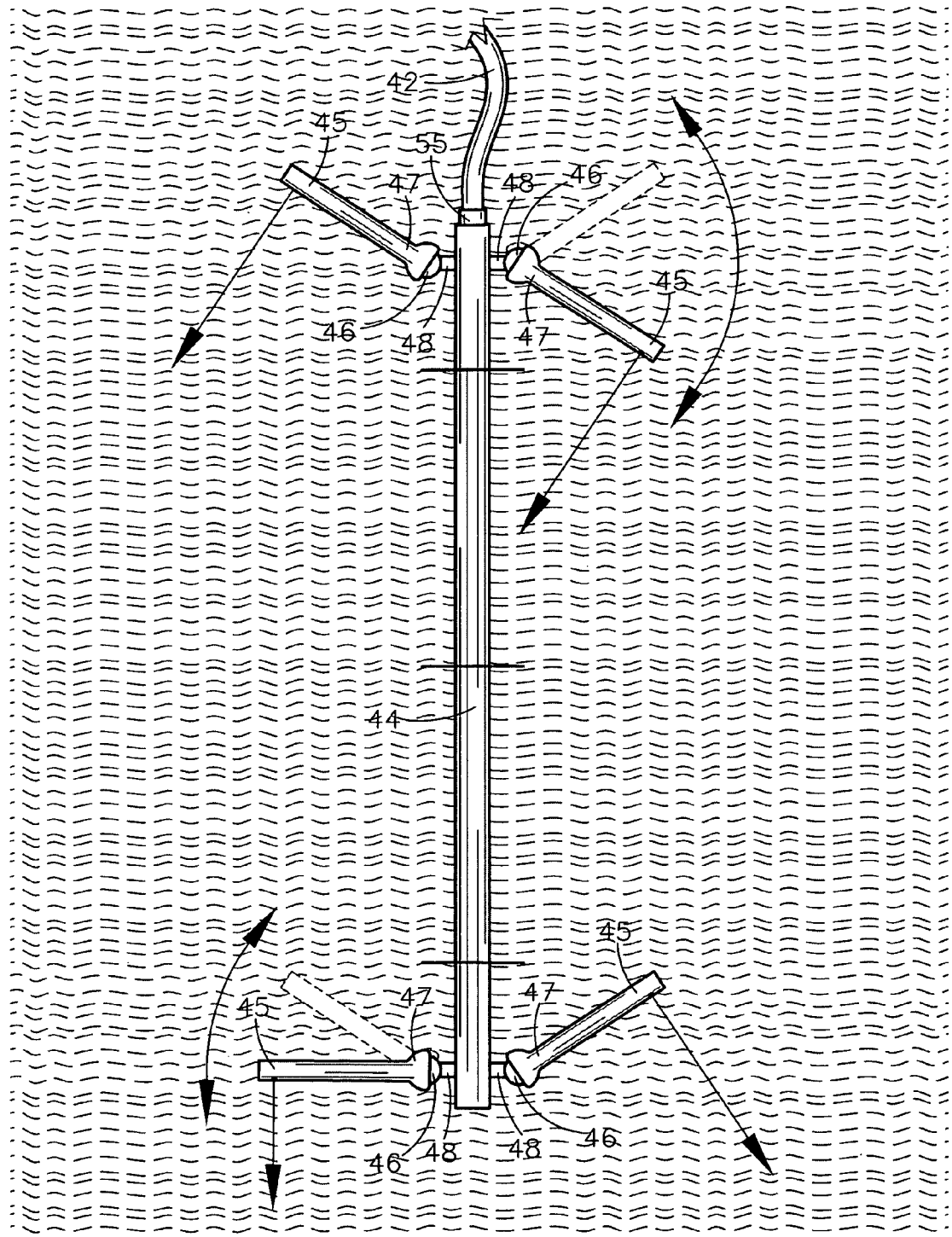
FIG. 3 is a top plan view showing rotational movement of the water discharge nozzles.
Figure 4:
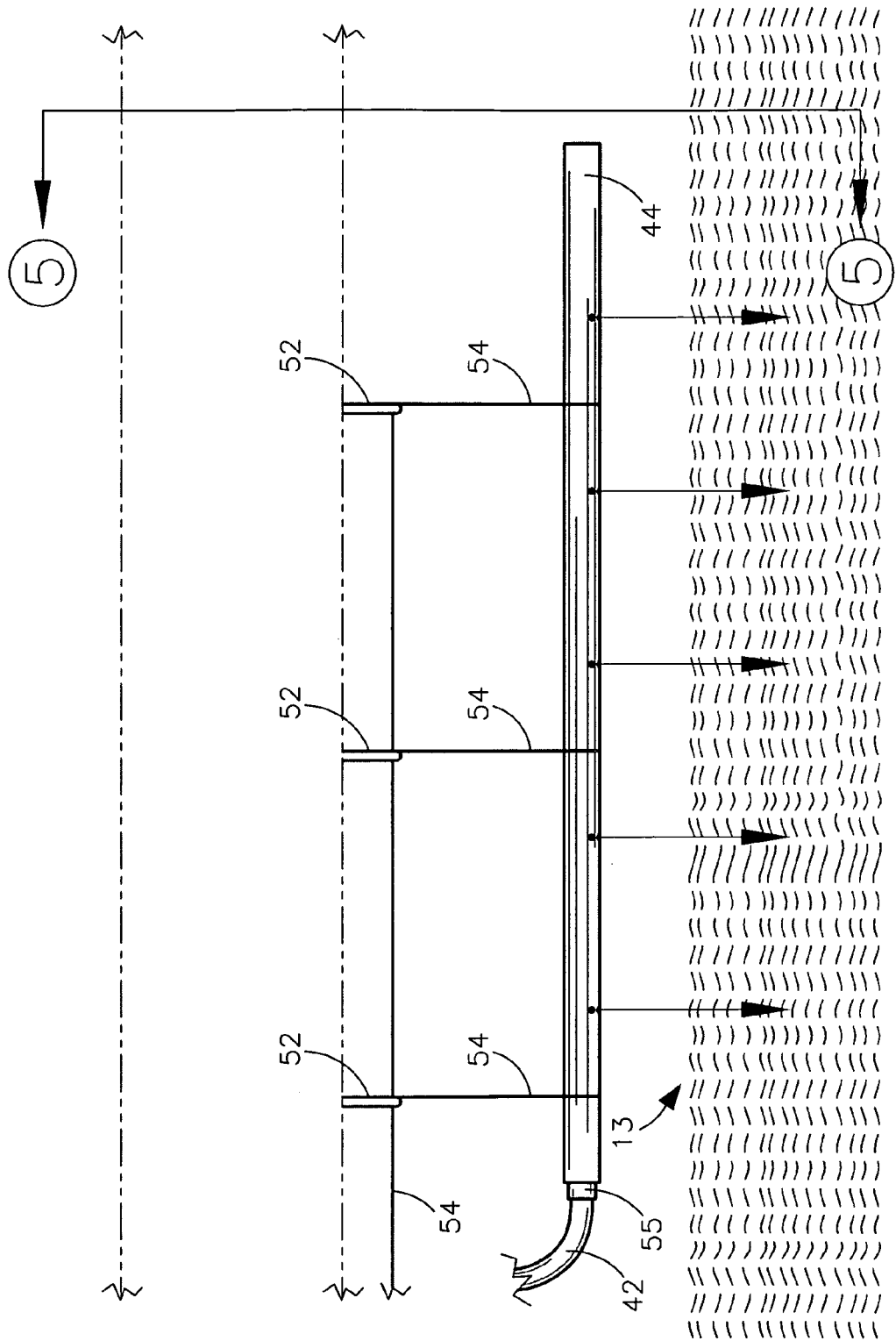
FIG. 4 is a side elevational view showing a portion of the water distributing mechanism.
Figure 5:
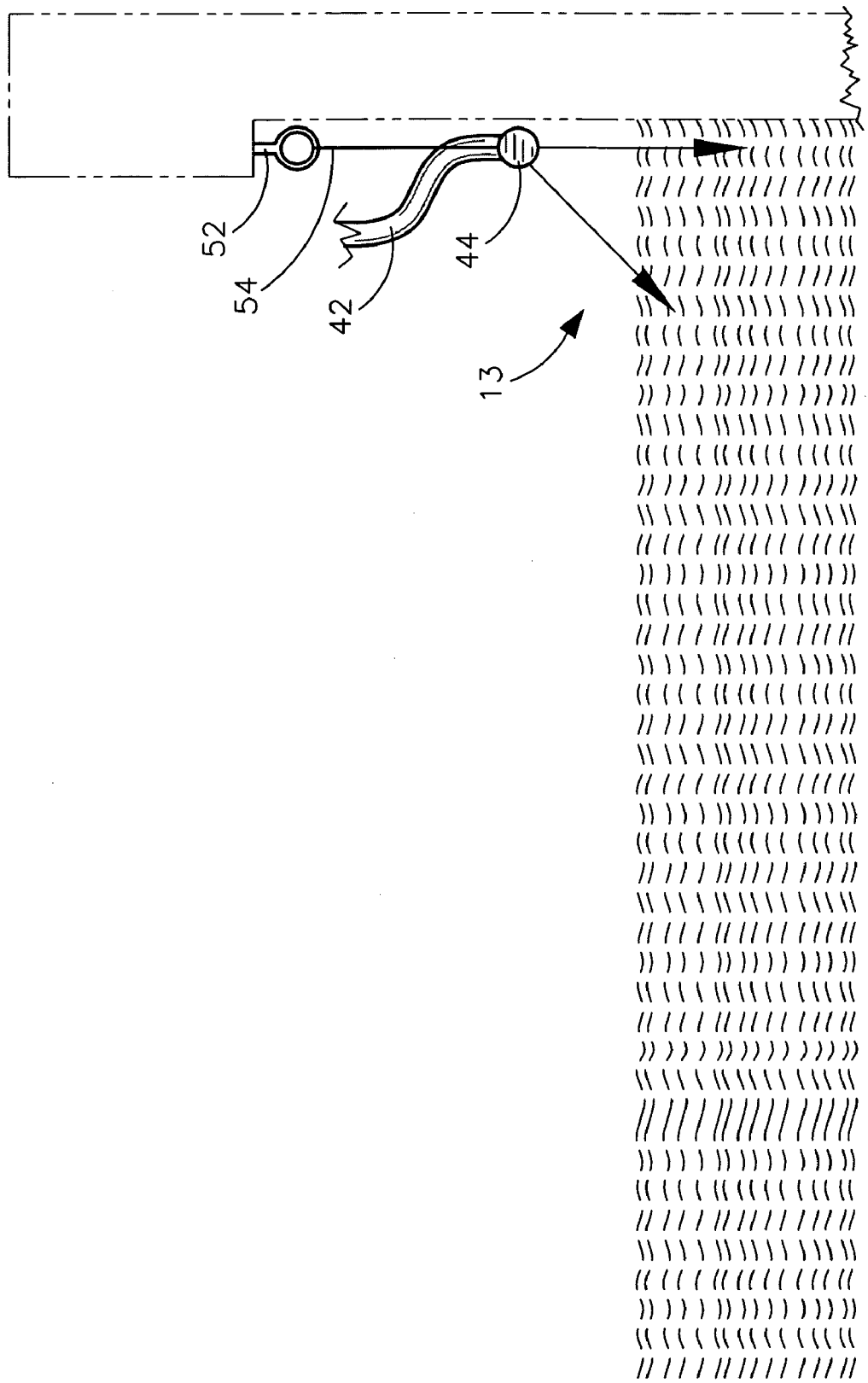
FIG. 5 is another side elevational view showing a portion of the water distributing mechanism.

Referring to FIGS. 2a, 2b, and 3, the water distributing mechanism 30 further may include a plurality of swivel joints 46 rotatably mating ingress ports 47 of the discharge nozzles 45 to egress ports 48 of the terminal conduits 44 respectively. In this manner, each of the discharge nozzles 45 may be independently articulated along a mutually exclusive arcuate path adjoining a corresponding one of the terminal conduits 44 respectively. Thus, a user may advantageously set each individual nozzle 45 to direct water at a desired angle to allow debris to be directed away from the existing structure. For example, as the conduits 44 may travel around the corners of the dock or retaining wall the nozzles 45 may be each angled to direct the debris out to a central location of the channel to thereby be drawn downstream and away from the user's property.

Figure 6:
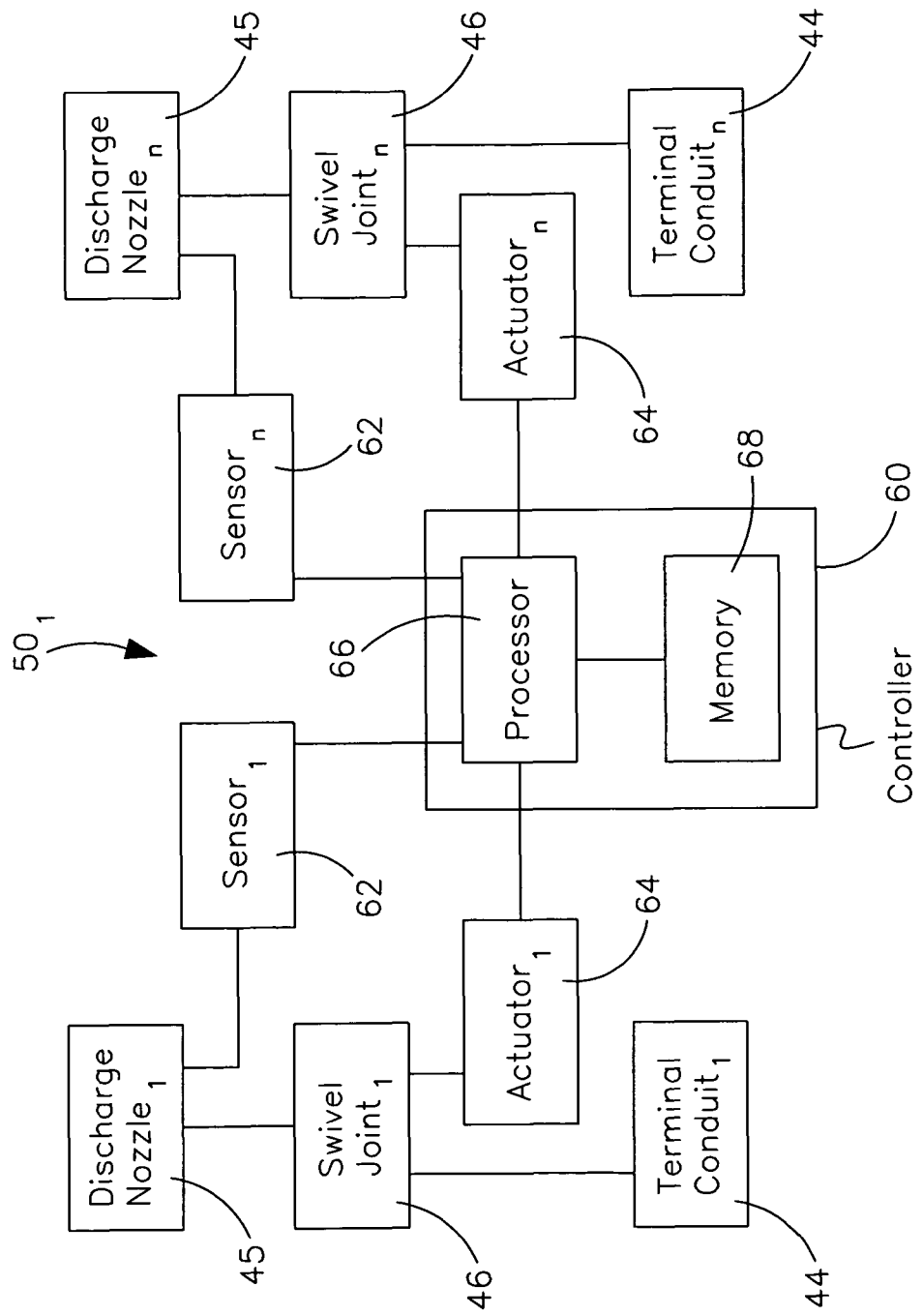
FIG. 6 is a schematic block diagram showing the interrelationship between the major components of the discharge angle adjusting mechanism.

Referring to FIGS. 2a, 2b, and 6, the automated water discharging system 10 further may include a mechanism 50 for automatically adjusting the water discharging angle egressing from the discharge nozzles 45. Such a mechanism 50 may operate such that the artificial current may continuously flow away from the existing support structure to thereby prohibit the buoyant debris from reaching the existing support structure. This may advantageously prevent build up of weeds, wood debris, and other waste floating in the lake or channel near the user's property, creating an aesthetically appealing environment and preserving the natural beauty of the waterfront property.

Now referring to FIGS. 2a and 2b, the water discharge angle adjusting mechanism 50 may additionally include a plurality of eyelets 52 anchored to the existing support surface and a plurality of cables 54 preferably having distal ends 55 anchored to the terminal conduits 44. Each of the cables 54 may be passed through corresponding ones of the eyelets 52 respectively. The water discharge angle adjusting mechanism 50 may also include a winch 56 positioned above the water line and communicatively coupled to proximal ends of the cables 54 such that the cables 54 may be selectively wound and unwound about the winch 56 as desired by the user.

The terminal conduits 44 may be uniformly raised and lowered when the cables 54 are wound and unwound from the winch 56 to thereby raise and lower the discharge nozzles 45 respectively. In this manner, a user may raise and lower the discharge nozzles 45 as the tide rises and falls, thereby advantageously keeping the nozzles 45 above the water at a desired height to continue a steady flow of water away from the water edge.

Referring again to FIGS. 2a and 2b, and specifically to FIG. 6, the water discharge angle adjusting mechanism 50 may also include a controller 60 preferably being programmable to receive at least one user-defined operating parameter. The operating parameter may be defined as a minimum threshold vertical distance between the water line and at least one of the discharge nozzles 45 respectively. The angle adjusting mechanism 50 may further include a plurality of sensors 62 communicatively coupled to the controller 60 and the discharge nozzles 45 respectively.

Additionally, a plurality of actuators 64 may be included and communicatively coupled to the controller 60 and the swivel joints respectively. The actuators 64 may bias the swivel joints to a desired position based upon information gathered and transmitted from the sensors 62 to the controller 60. Each of the sensors 62 may detect a real-time vertical distance between a corresponding one of the discharge nozzles 45 and the water line. The sensors 62 may periodically generate and transmit a plurality of distance signals to the controller 60 respectively.

Further, each of the user-defined minimum threshold vertical distances and the distance signals may have an associated numerical value embedded therein respectively. In this manner, the water discharge angle adjusting mechanism 50 may automatically maintain the desired angle of water discharge from the system 10. If the tide rises or falls, the controller 60 may receive signals from the sensors 62, calculate the distance between the nozzles 45 and water surface, and adjust the angle of distribution from each nozzle 45 accordingly to maintain the desired flow rate of water moving away from the user's property.

Referring again to FIG. 6, the controller 60 may additionally include a processor 66 and a memory 68 communicatively coupled to the processor 66. The memory 68 may include software instructions that cause the controller 60 to generate and transmit a control signal to each of the discharge nozzles 45 when at least one of the real-time vertical distance drops below a corresponding one of the at least one user-defined minimum threshold vertical distances respectively.

Further, the software instructions may include and execute a control logic algorithm including the steps of the controller 60 first learning the real-time vertical distances by receiving the detected signals from the sensors 62 respectively. The controller 60 may then compare the real-time vertical distances with a corresponding one of the at least one user-defined minimum threshold vertical distance. Thirdly, if an associated one of the real-time vertical distances is less than the corresponding one of the at least one user-defined minimum threshold vertical distances, then the processor 66 may generate and transmit a first control signal to one of the actuators 64 associated with the discharge nozzle.

Finally, if an associated one of the real-time vertical distances is greater than the corresponding one of the at least one user-defined minimum threshold vertical distance, then the processor 66 may repeat the first three steps. The first control signal may cause a corresponding one of the actuators 64 to pivot a corresponding one of the swivel joints and thereby articulate a corresponding one of the discharge nozzles 45 to an elevated position. The controller 60 provides the unexpected and unpredictable result of automatically maintaining the nozzles at a desired angle even when the tide raises and lowers the level of the water in relation to the positioning of the system 10. Such a beneficial feature is not rendered obvious by one skilled in the art.

Figure 7:
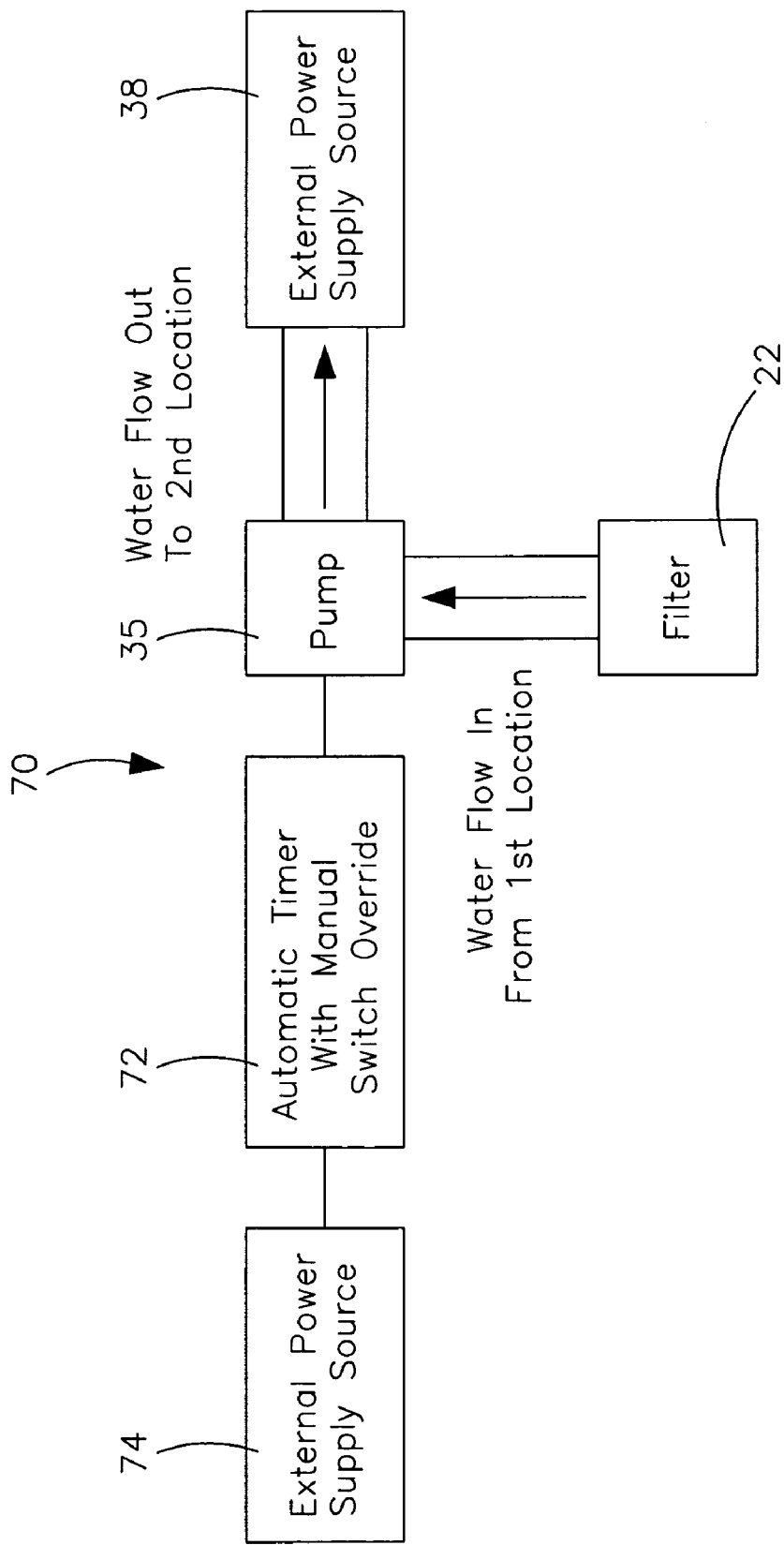
FIG. 7 is a schematic block diagram showing the interrelationship between the major components of the automatic toggling mechanism.

Now referring to FIG. 7, the automated water discharging system 10 further may include a mechanism 70 for automatically toggling the water extracting and channeling mechanism between operating and non-operating modes. The automatic toggling mechanism 70 may include a timer switch 72 communicatively coupled to the pump 35 and further adapted to be electrically coupled to an existing external power supply source 74.

The timer switch 72 may be automatically toggled between open and closed positions based upon programmable user-defined parameters such that power may be interrupted to the pump 35 when the timer switch 72 is at the open position. The programmable timer switch 72 may advantageously allow the user to determine certain times of the day when the system 10 may operate to clear debris from the user's property. Thus, to prevent the system 10 from operating at times when the user may be using or enjoying the dock or water edge, the user may set the system 10 to only operate at night, for example.

Referring to FIGS. 1-7 generally, the present invention may further include a method for prohibiting buoyant debris from reaching and engaging an existing support structure that is partially submerged in an existing body of water. Such a method may include the chronological steps of first providing a mechanism 20 for extracting and channeling water from a first location 11 to a second location 12. The first location 11 may be defined beneath a water line of the existing body of water and the second location 12 may be defined above the water line of the existing body of water. Second, the method may include providing and disposing a filter 22 at the first location.

Third, the method may entail directly coupling the filter 22 to the water extracting and channeling mechanism 20. A fourth step of the method may include providing a mechanism 30 for distributing water from the second location to a plurality of third locations 13. Fifth, the method may include extracting and channeling the water from the first location 11 to the second location 12. A sixth step may entail selectively discharging the water downwardly towards the water line to thereby create an artificial current flowing away from the existing support structure for urging the buoyant debris away from the existing support structure. Finally, the method may include a seventh step of selectively adjusting the water distributing mechanism 30 between open and closed positions for regulating a flow rate of the artificial current.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An automated water discharging system for prohibiting buoyant debris from reaching and engaging an existing support structure that is partially submerged in an existing body of water, said automated water discharging system comprising:
- means for extracting and channeling water from a first location to a second location, said first location being defined beneath a water line of the existing body of water and said second location being defined above the water line of the existing body of water;
- a filter disposed at said first location and being directly coupled to said water extracting and channeling means;
- means for distributing water from said second location to a plurality of third locations such that the water is selectively discharged downwardly towards the water line and thereby creates an artificial current flowing away from the existing support structure for urging the buoyant debris away from the existing support structure;
- wherein said water extracting and channeling means comprises:
- a first conduit having a distal end submerged below the water line and situated at said first location, said first conduit further having a proximal end situated above the water line;
- a power-actuated pump directly coupled to said proximal end of said first conduit and being in fluid communication with said first conduit;
- a second conduit coupled to said pump and extending downstream therefrom such that said second conduit channels the water away from said first location and to said second location;
- wherein said water distributing means comprises:
- a water distribution manifold housed at said second location, said water distribution manifold having an inlet directly coupled to said second conduit such that said water distribution manifold receives the water downstream from said second conduit, said water distribution manifold having a plurality of outlets situated downstream of said inlet;
- a plurality of intermediate conduits removably coupled to said outlets and thereby independently distributing the water away from said second location and along a plurality of mutually exclusive travel paths leading to said third locations respectively;
- a plurality of terminal conduits, each of said terminal conduits being coupled to a corresponding one of said intermediate conduits respectively such that the water is directed along a plurality of non-overlapping linear travel paths while traveling to said third locations;
- a plurality of discharge nozzles fluidly coupled to said terminal conduits in such a manner that the water is discharged at an angle defined downwardly towards the water line and thereby creates the artificial current leading away from the existing support structure;
- wherein said water distributing means further comprises:
- a plurality of swivel joints rotatably mating ingress ports of said discharge nozzles to egress ports of said terminal conduits respectively such that each of said discharge nozzles are independently articulated along a mutually exclusive arcuate path adjoining a corresponding one of said terminal conduits respectively; and
- means for automatically adjusting said water discharging angle egressing from said discharge nozzles such that the artificial current continuously flows away from the existing support structure and thereby prohibits the buoyant debris from reaching the existing support structure.

2. The automated water discharging system of claim 1, where said water discharge angle adjusting means comprises:
- a plurality of eyelets anchored to the existing support surface;
- a plurality of cables having distal ends anchored to said terminal conduits, each of said cables being passed through corresponding ones of said eyelets respectively; and
- a winch positioned above the water line and communicatively coupled to proximal ends of said cables such that said cables are selectively wound and unwound about said winch as desired by the user;
- wherein said terminal conduits are uniformly raised and lowered when said cables are wound and unwound from said winch and thereby raise and lower said discharge nozzles respectively.

3. The automated water discharging system of claim 1, wherein said water discharge angle adjusting means comprises:
- a controller being programmable to receive at least one user-defined operating parameter, said operating parameter being defined as a minimum threshold vertical distance between the water line and at least one of said discharge nozzles respectively;
- a plurality of sensors communicatively coupled to said controller and said discharge nozzles respectively; and
- a plurality of actuators communicatively coupled to said controller and said swivel joints respectively;
- wherein said actuators bias said swivel joints to a desired position based upon information gathered and transmitted from said sensors to said controller;
- wherein each of said sensors detects a real-time vertical distance between a corresponding one of said discharge nozzles and the water line, said sensors periodically generating and transmitting a plurality of distance signals to said controller respectively;
- wherein each of said user-defined minimum threshold vertical distances and said distance signals have an associated numerical value embedded therein respectively.

4. The automated water discharging system of claim 3, wherein said controller comprises:
- a processor; and
- a memory communicatively coupled to said processor, said memory including software instructions that cause said controller to generate and transmit a control signal to each of said discharge nozzles when at least one of said real-time vertical distance drops below a corresponding one of said at least one user-defined minimum threshold vertical distances respectively;
- wherein said software instructions comprise and execute a control logic algorithm including the steps of:
  - i. said controller learning said real-time vertical distances by receiving said detected signals from said sensors respectively,
  - ii. comparing said real-time vertical distances with a corresponding one of said at least one user-defined minimum threshold vertical distance,
  - iii. if an associated one of said real-time vertical distances is less than said corresponding one of said at least one user-defined minimum threshold vertical distances, then said processor generating and transmitting a first control signal to one of said actuators associated with said discharge nozzle, and
  - iv. if an associated one of said real-time vertical distances is greater than said corresponding one of said at least one user-defined minimum threshold vertical distance, then said processor repeats steps i. through iii.;

wherein said first control signal causes a corresponding one of said actuators to pivot a corresponding one of said swivel joints and thereby articulate a corresponding one of said discharge nozzles to an elevated position.

5. The automated water discharging system of claim 1, further comprising: means for automatically toggling said water extracting and channeling means between operating and non-operating modes, said automatic toggling means including a timer switch communicatively coupled to said pump and further being adapted to be electrically coupled to an existing external power supply source;
wherein said timer switch is automatically toggled between open and closed positions based upon programmable user-defined parameters such that power is interrupted to said pump when said timer switch is at the open position.

6. An automated water discharging system for prohibiting buoyant debris from reaching and engaging an existing support structure that is partially submerged in an existing body of water, said automated water discharging system comprising:
means for extracting and channeling water from a first location to a second location, said first location being defined beneath a water line of the existing body of water and said second location being defined above the water line of the existing body of water;
a filter disposed at said first location and being directly coupled to said water extracting and channeling means;
means for distributing water from said second location to a plurality of third locations such that the water is selectively discharged downwardly towards the water line and thereby creates an artificial current flowing away from the existing support structure for urging the buoyant debris away from the existing support structure;
wherein said water distributing means is selectively adjustable between open and closed positions for regulating a flow rate of the artificial current;
wherein said water extracting and channeling means comprises:
a first conduit having a distal end submerged below the water line and situated at said first location, said first conduit further having a proximal end situated above the water line;
a power-actuated pump directly coupled to said proximal end of said first conduit and being in fluid communication with said first conduit;
a second conduit coupled to said pump and extending downstream therefrom such that said second conduit channels the water away from said first location and to said second location;
wherein said water distributing means comprises:
a water distribution manifold housed at said second location, said water distribution manifold having an inlet directly coupled to said second conduit such that said water distribution manifold receives the water downstream from said second conduit, said water distribution manifold having a plurality of outlets situated downstream of said inlet;
a plurality of intermediate conduits removably coupled to said outlets and thereby independently distributing the water away from said second location and along a plurality of mutually exclusive travel paths leading to said third locations respectively;
a plurality of terminal conduits, each of said terminal conduits being coupled to a corresponding one of said intermediate conduits respectively such that the water is directed along a plurality of non-overlapping linear travel paths while traveling to said third locations;
a plurality of discharge nozzles fluidly coupled to said terminal conduits in such a manner that the water is discharged at an angle defined downwardly towards the water line and thereby creates the artificial current leading away from the existing support structure;
wherein said water distributing means further comprises:
a plurality of swivel joints rotatably mating ingress ports of said discharge nozzles to egress ports of said terminal conduits respectively such that each of said discharge nozzles are independently articulated along a mutually exclusive arcuate path adjoining a corresponding one of said terminal conduits respectively; and
means for automatically adjusting said water discharging angle egressing from said discharge nozzles such that the artificial current continuously flows away from the existing support structure and thereby prohibits the buoyant debris from reaching the existing support structure.

7. The automated water discharging system of claim 6, where said water discharge angle adjusting means comprises:
a plurality of eyelets anchored to the existing support surface;
a plurality of cables having distal ends anchored to said terminal conduits, each of said cables being passed through corresponding ones of said eyelets respectively; and
a winch positioned above the water line and communicatively coupled to proximal ends of said cables such that said cables are selectively wound and unwound about said winch as desired by the user;
wherein said terminal conduits are uniformly raised and lowered when said cables are wound and unwound from said winch and thereby raise and lower said discharge nozzles respectively.

8. The automated water discharging system of claim 6, wherein said water discharge angle adjusting means comprises:
a controller being programmable to receive at least one user-defined operating parameter, said operating parameter being defined as a minimum threshold vertical distance between the water line and at least one of said discharge nozzles respectively;
a plurality of sensors communicatively coupled to said controller and said discharge nozzles respectively; and
a plurality of actuators communicatively coupled to said controller and said swivel joints respectively;
wherein said actuators bias said swivel joints to a desired position based upon information gathered and transmitted from said sensors to said controller;
wherein each of said sensors detects a real-time vertical distance between a corresponding one of said discharge nozzles and the water line, said sensors periodically generating and transmitting a plurality of distance signals to said controller respectively;
wherein each of said user-defined minimum threshold vertical distances and said distance signals have an associated numerical value embedded therein respectively.

9. The automated water discharging system of claim 8, wherein said controller comprises:
a processor; and
a memory communicatively coupled to said processor, said memory including software instructions that cause said controller to generate and transmit a control signal to each of said discharge nozzles when at least one of said real-time vertical distance drops below a corresponding one of said at least one user-defined minimum threshold vertical distances respectively;

wherein said software instructions comprise and execute a control logic algorithm including the steps of:
  i. said controller learning said real-time vertical distances by receiving said detected signals from said sensors respectively,
  ii. comparing said real-time vertical distances with a corresponding one of said at least one user-defined minimum threshold vertical distance,
  iii. if an associated one of said real-time vertical distances is less than said corresponding one of said at least one user-defined minimum threshold vertical distances, then said processor generating and transmitting a first control signal to one of said actuators associated with said discharge nozzle, and
  iv. if an associated one of said real-time vertical distances is greater than said corresponding one of said at least one user-defined minimum threshold vertical distance, then said processor repeats steps i. through iii.;

wherein said first control signal causes a corresponding one of said actuators to pivot a corresponding one of said swivel joints and thereby articulate a corresponding one of said discharge nozzles to an elevated position.

10. The automated water discharging system of claim 6, further comprising:

means for automatically toggling said water extracting and channeling means between operating and non-operating modes, said automatic toggling means including a timer switch communicatively coupled to said pump and further being adapted to be electrically coupled to an existing external power supply source;

wherein said timer switch is automatically toggled between open and closed positions based upon programmable user-defined parameters such that power is interrupted to said pump when said timer switch is at the open position.

* * * * *